(12) United States Patent
Meijer et al.

(10) Patent No.: US 8,108,711 B2
(45) Date of Patent: Jan. 31, 2012

(54) SYSTEMS AND METHODS FOR HOSTING AND TESTING SERVICES OVER A NETWORK

(75) Inventors: Henricus Johannes Maria Meijer, Mercer Island, WA (US); Dragos A. Manolescu, Kirtland, WA (US); Per Anton Vonge Nielsen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/929,970

(22) Filed: Oct. 30, 2007

(65) Prior Publication Data
US 2009/0113250 A1  Apr. 30, 2009

(51) Int. Cl.
*G06F 11/00* (2006.01)
*G06F 11/22* (2006.01)

(52) U.S. Cl. ......... 714/4.1; 714/4.3; 714/25; 714/38.14; 709/220; 709/228

(58) Field of Classification Search ............ 714/26, 714/48, 57, 4.1, 4.3, 25, 27, 38.14; 702/186; 709/220, 221, 228
See application file for complete search history.

(56) References Cited

U.S. PATENT DOCUMENTS

| | | | | |
|---|---|---|---|---|
| 6,167,537 A * | 12/2000 | Silva et al. | .................. | 714/46 |
| 7,516,351 B2 * | 4/2009 | Inami et al. | .................. | 714/1 |
| 7,640,457 B2 * | 12/2009 | Erwin et al. | ................ | 714/26 |
| 2002/0133575 A1 * | 9/2002 | Cidon et al. | ................ | 709/220 |
| 2002/0177977 A1 * | 11/2002 | Scarlat et al. | ............... | 702/186 |
| 2005/0021687 A1 * | 1/2005 | Anastassopoulos et al. | . | 709/220 |
| 2005/0144507 A1 * | 6/2005 | Lee et al. | ................... | 714/4 |
| 2005/0197967 A1 * | 9/2005 | Booth et al. | ................ | 705/62 |
| 2007/0106758 A1 * | 5/2007 | Chi et al. | ................... | 709/219 |
| 2008/0086720 A1 * | 4/2008 | Lekel | .......................... | 717/124 |
| 2008/0133964 A1 * | 6/2008 | Rogers et al. | ................. | 714/4 |

* cited by examiner

*Primary Examiner* — Joseph Schell

(57) ABSTRACT

Communication symmetry is leveraged to facilitate testing of network services. To identify, isolate, understand, and resolve problems a test client is employed. In accordance with one aspect, a service can be provided for execution on a service consumer while the test client resides on a service provider. Roles are reversed to provide more testing freedom on the provider side and less intrusion on the consumer side. Additionally or alternatively, a service and/or test client can be shipped to consumers to aid testing in a real execution environment.

17 Claims, 12 Drawing Sheets

SYSTEMS AND METHODS FOR HOSTING AND TESTING SERVICES OVER A NETWORK

BACKGROUND

Computer programming refers to the process of writing and testing of computer programs. Computer programs are groups of instructions specified in one or more programming languages that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

Increasingly, computer programming or coding is shifting away from single devices and toward distributed systems. Client/server architectures of the past have reemerged as a dominant computing paradigm thanks to advances in network communication as well the advent of the Internet. Moreover, development is moving toward software as a service. Here, applications are designed as network accessible services. More specifically, functionality that transcends a single application, and could thus be reused, is factored into services. Instead of implementing this functionality in their applications, developers consume these services thereby enabling them to focus on unique aspects.

Service code executes in environments different from ones where consumer code execute. Typically, the hardware capabilities differ sharply. Services run on enterprise-class hardware optimized to serve large numbers of consumers. In contrast, consumers run on a wide range of hardware with capabilities far below what is available on the service side. The platforms also differ. The services and service consumers could run on platforms subject to very different design goals. For example, a service could run on a redundant, multiprocessor host running server software, while a service consumer could execute on a battery-powered phone running a web browser. The segregation of service code has had a strong impact on how it is designed, developed, and tested.

Service failures are typically caused by software defects and communication failures. Consequently, as in other distributed systems, end-to-end testing encompasses the service provider code as well as the communication between service consumers and a service provider.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains generally to service testing. In one instance, testing can be performed by transmitting tests or test clients to a consumer or client to exercise a provider or server executed service in an attempt to identify problems with the service, service consumer, and/or consumer-provider communication path. Alternatively and in accordance with one aspect of the disclosed subject matter, the roles can be reversed. In particular, the service can be shipped to a consumer while the associated test utilized to exercise the service is under control of the provider. While test results will be the same, this counter intuitive test mode or configuration provides a number of advantages over the alternative approach. More specifically, it can be less intrusive on consumers and more flexible with respect to testing, among other things.

In accordance with another aspect of the disclosure, testing can be performed in a real environment. Tests simulate functional and non-functional interactions of real consumers with a service. However, this is a challenging issue in light of differences between test and real environments (e.g., number of consumers, concurrent operations . . . ). The challenge is addressed herein by shipping a test client or service to consumers to facilitate execution of tests in a real environment. The test client can be shipped to run tests under conditions that are hard or expensive to replicate. The service can be shipped to keep the test client under control.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are described hereinafter pertaining to service testing. A test client provides functionality for identifying service issues. In accordance with one aspect, consumer and provider roles are reversed such that the service is provided for execution on the client and the test client operates from the provider. This minimizes consumer side disruption while also providing more testing freedom, among other things. Test results can subsequently be utilized to configure the service prior to conventional deployment. According to another aspect, test clients or services can be distributed to consumers for execution in a live rather than test environment.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
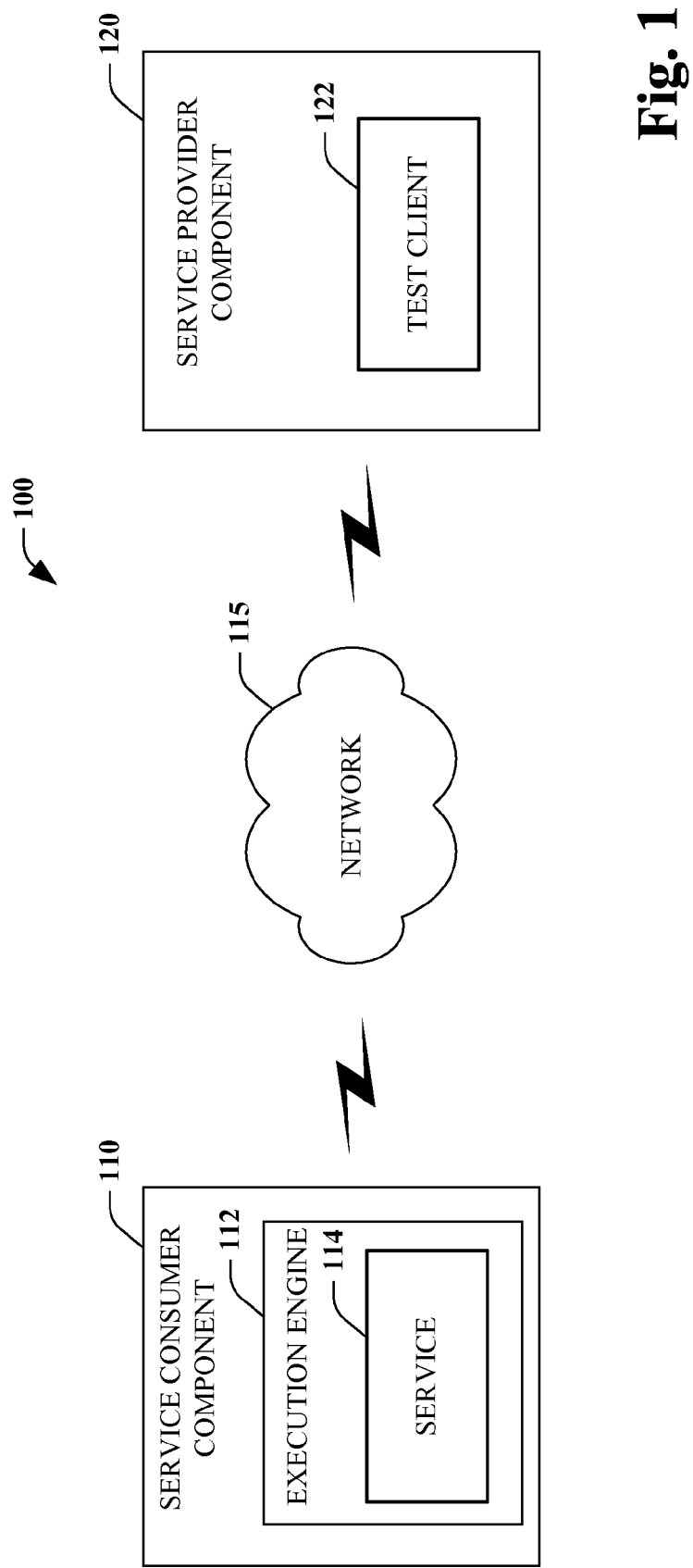
FIG. 1 is a block diagram of a service testing system in accordance with an aspect of the disclosed subject matter.

Referring initially to FIG. 1, service testing system 100 is illustrated in accordance with an aspect of the claimed subject matter. As illustrated, a service consumer component 110 and a service provider component 120 are communicatively coupled by network 115. The service consumer component 110 is operable to consume or interact with a service supplied by the service provider component 120. According to one embodiment, the service consumer component 110 can correspond to a client and the service provider component a server in a client/server architecture. The network provides a consumer-provider communication path. In one instance, the network can correspond to the Internet.

Conventional service processing calls for the service provider component 120 to provide the service and the service consumer component 110 to consumer or interact with the service. During testing, a test client could reside on the service consumer component 120 and target a service for testing provided by the service provider component 120. Here, the roles are reversed in accordance with an aspect of the claimed subject matter. In particular, test client 122 resides with or is hosted by service provider component 120 and service 114 is hosted by the service consumer component 110.

Service testing to identify, isolate, understand, and resolve problems or issues involves test client 122, the consumer-provider communication path 115 (which typically crosses additional components such as proxies, firewalls, etc.) and the service provider component 120. End to end testing entails programming the test client 122 to exercise areas under test. However, unless the service consumer component 110 and service provider component 120 belong to the same organization (which they often do not), the service provider component 120 has very limited access to the other side of the connection, namely the service consumer component 110. For instance, an organization would have to allow installation of the test client 122 on their system and provide network access to allow the test client to exercise a service and verify various things. This constraint is incompatible with end to end testing.

End to end testing requires much more freedom on the test client side rather than the service side. Accordingly, the service 114 and test client 122 are swapped as shown. Now, the service provider component 120 has direct access to the test client and full control over the battery of tests executed while the communication takes place over the network component 115, which need not be simulated. This provides great flexibility to easily modify tests that otherwise would have required re-installation and/or reconfiguration of the test client 122 on all service consumer components 110. Further, the service consumer component 110 need not be disrupted with installation of the test client 122. Rather, the consumer component 110 need only execute the service and respond to testing.

The service can be executed by execution engine 112. This can correspond to any runtime or execution environment supported by the service consumer component 110. However, in accordance with on aspect of the claimed subject matter, the execution engine 112 can be a web browser. In this case, all that is required to initiate testing is navigating to a particular web address. Subsequently, the service 112 or a proxy service can be loaded in the browser, which triggers and is responsive to the test client 122. This is much less intrusive than installing a test client 122 on a consumer organization computer, and the same testing can be performed. Moreover, testing occurs over the same network as the client/service would use for actual operations. Hence, a network need not be simulated. Additionally, this allows performance of end-to-end testing, going through all other intermediate components (e.g., firewalls, switches, bridges . . . ).

An additional benefit of the system 100 relates to confidentiality of data on both the provider and consumer side. On the provider side, tests and/or test data are unknown to consumers. In some instances, there may be something sensitive about the test data, data access, communication, etc. that is desired to be kept confidential. By housing the test client on the provider rather than the consumer, this information can remain confidential. On the consumer side, the service can employ consumer data without exposing it to the test client or associated provider. For example, if there are many amendments on an insurance policy and the identity of the related individual and the amendments themselves are considered confidential, the service under test can pull this information from a consumer database such that a test client is unaware of the particulars of the data. Thus, the service shipped to the consumer, rather than the provider, can access data to which it would not have had access otherwise.

Figure 2:
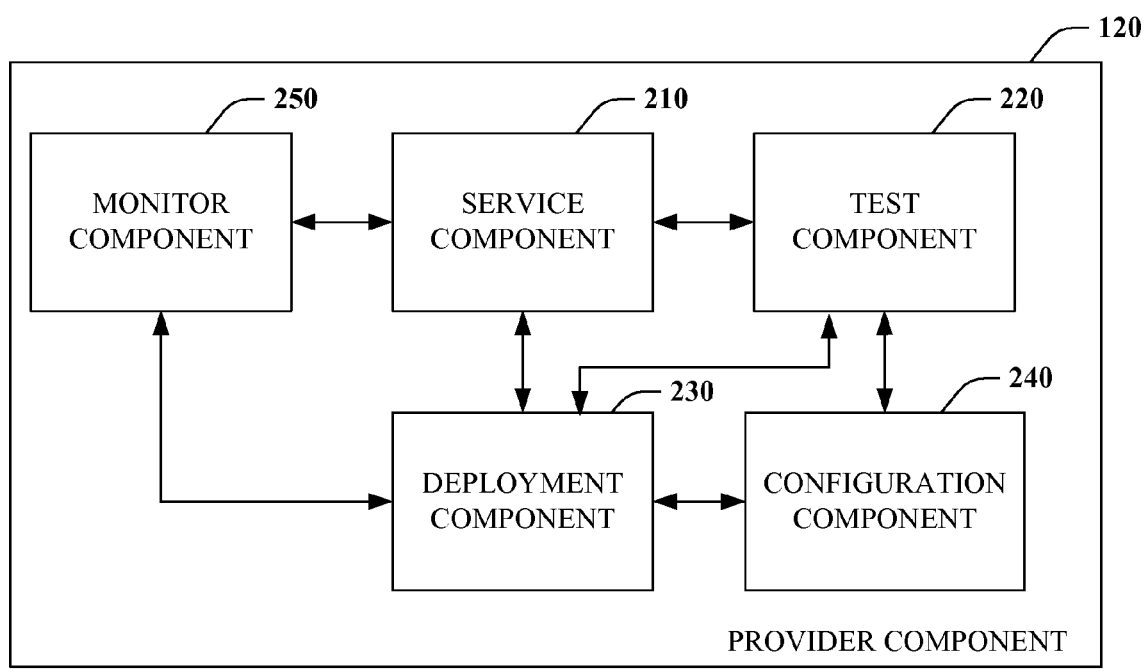
FIG. 2 is a block diagram of a representative service provider component in accordance with an aspect of the disclosed subject matter.

Turning to FIG. 2, a representative service provider component 120 is illustrated in accordance with an aspect of the claimed subject matter. The service component 120 includes a number of components that facilitate many modes of operation. In general, service component 210 and test component 220 manage operation with respect to services and tests, respectively. Deployment component 230 is a mechanism for deploying services as well as consumers, for example after testing has terminated. Configuration component 240 configures or optimizes services and/or consumers deployed by the deployment component 230 in response to test results. Finally, monitor component 250 monitors interaction and can initiate testing behind the scenes. Components will now be discussed in further detail with respect to various modes of operation.

Figure 3:
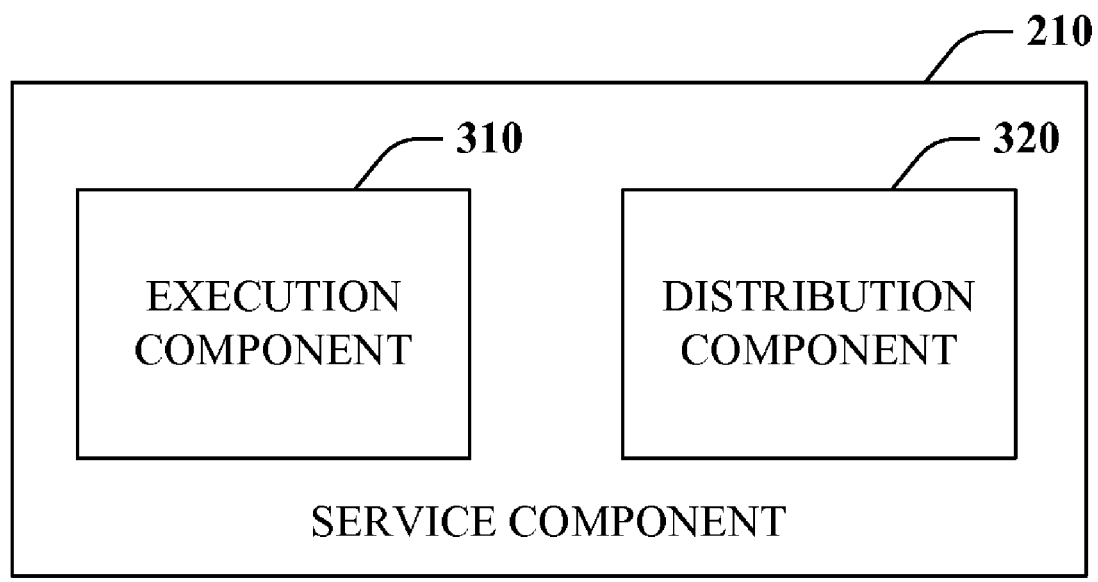
FIG. 3 is a block diagram of a representative service component according to an aspect of the disclosure.

As previously described with respect to FIG. 1, testing can be accomplished by swapping consumer and provider components, namely service and test client. Stated differently, the system transforms relationships from many to one (many test clients and one service) to one to many (one test client and many services). The service component 210 and test component 210 enable this functionality. As shown in FIG. 3, the service component 210 can include a distribution component 320 that distributes a service to one or more consumers for execution. Service distribution can trigger application of testing via test component 220.

Figure 4:
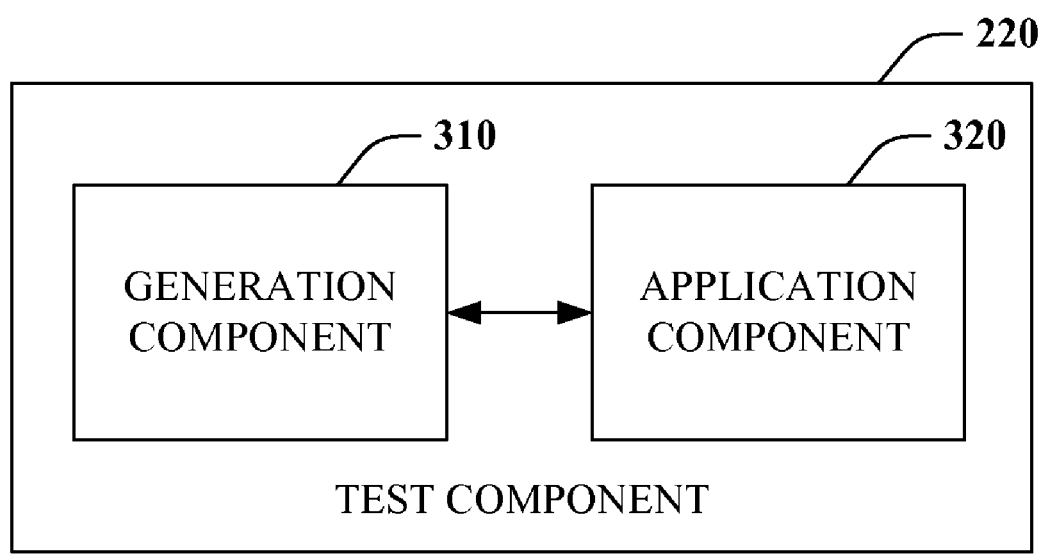
FIG. 4 is a block diagram of a representative test component according to an aspect of the disclosure.

Referring briefly to FIG. 4, a representative test component 220 is illustrated in further detail in accordance with an aspect of the claimed subject matter. The test component 220 includes both a generation component 310 and an application component 320. The generation component 310 enables a test client to be generated and/or modified. Each test client can include a plurality of different tests of a service and associated communication path. The application component 320 applies tests to a service. As mentioned, this can be triggered by distribution of a service to a consumer, among other things.

Application of tests produces test results that can be output for later use. It should be appreciated that subsequent to application, a test client can be modified or regenerated utilizing generation component 310 and subsequently reapplied. This provides flexibility that is not available if the service and consumer are not swapped.

Returning to FIG. 2, after testing is complete, the service can be deployed as usual utilizing deployment component 230. Deployment component 230 deploys the service on the provider and can provide service consumers to consumers. The service can be executed by an execution component 310 associated with the service component 210 depicted in FIG. 3. Furthermore, it is to be noted that the configuration component 240 can configure the service and/or the consumer in accordance with the test results afforded by the test component 220. For example, where an error is identified in the service, the configuration component 240 can be employed to rectify the issue. Additionally or alternatively, the configuration component 240 can modify a service or consumer to optimize interaction and/or processing efficiency. For instance, where network connection speed is an issue, a lower bandwidth version of the application can be deployed.

Figure 5:
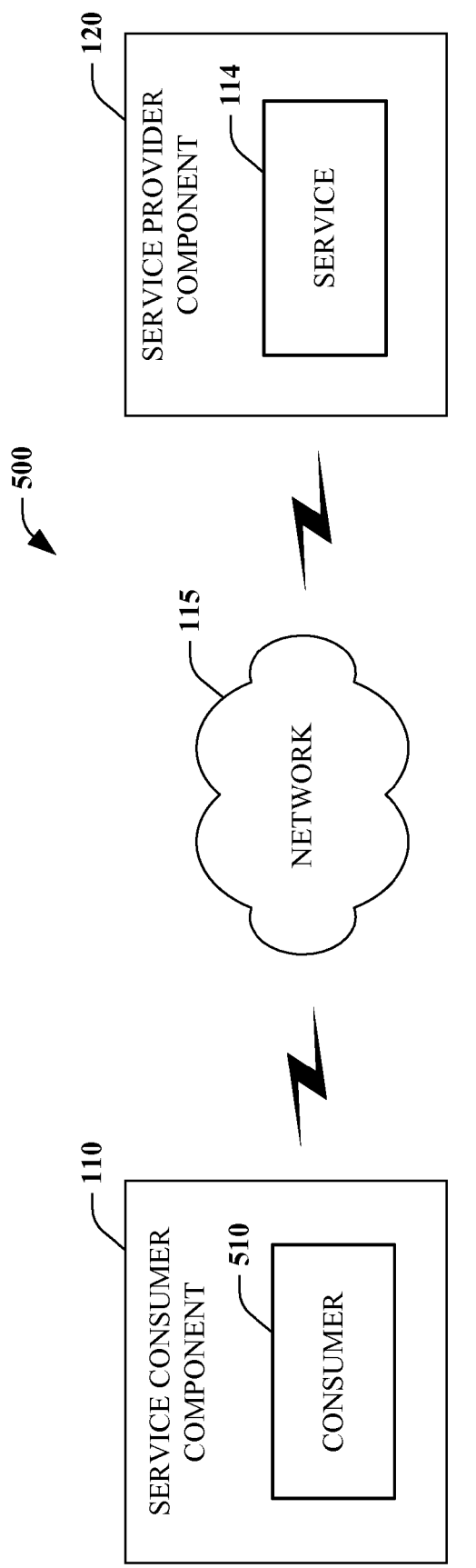
FIG. 5 is a block diagram of a deployed service system in accordance with an aspect of the disclosed subject matter.

FIG. 5 depicts a deployed service system 500 in accordance with an aspect of the subject matter. Similar to system 100 of FIG. 1, the system 500 includes the service consumer component 110, network 115, and service provider component 120. Here, however, the service 114 resides on the service provider side. A service consumer 510 resides on the service consumer side as shown within the service consumer component 110. In other words, the service is deployed in a conventional consumer/provider architecture where the provider provides and the consumer consumes.

Turning attention back to FIG. 2, it is to be noted that monitor component 250 can influence if and when a test is performed. A test setting need not be set up explicitly. Testing can be performed behind the scenes with or without user knowledge. The monitor component 250 can identify an injection point to initiate testing. For instance, the monitor component 250 can monitor a service executed by the service component 210 and initiate testing of yet another service through the service component 210 when available processing time is identified such as where it is determined or inferred that a user will spend some amount of time entering data for submission. This can be utilized to test new versions or features of the executing service or an entirely different service. This can be done with user permission (e.g., explicit permission, preferences, license agreement . . . ) and/or in more of a stealth mode.

Figure 6:
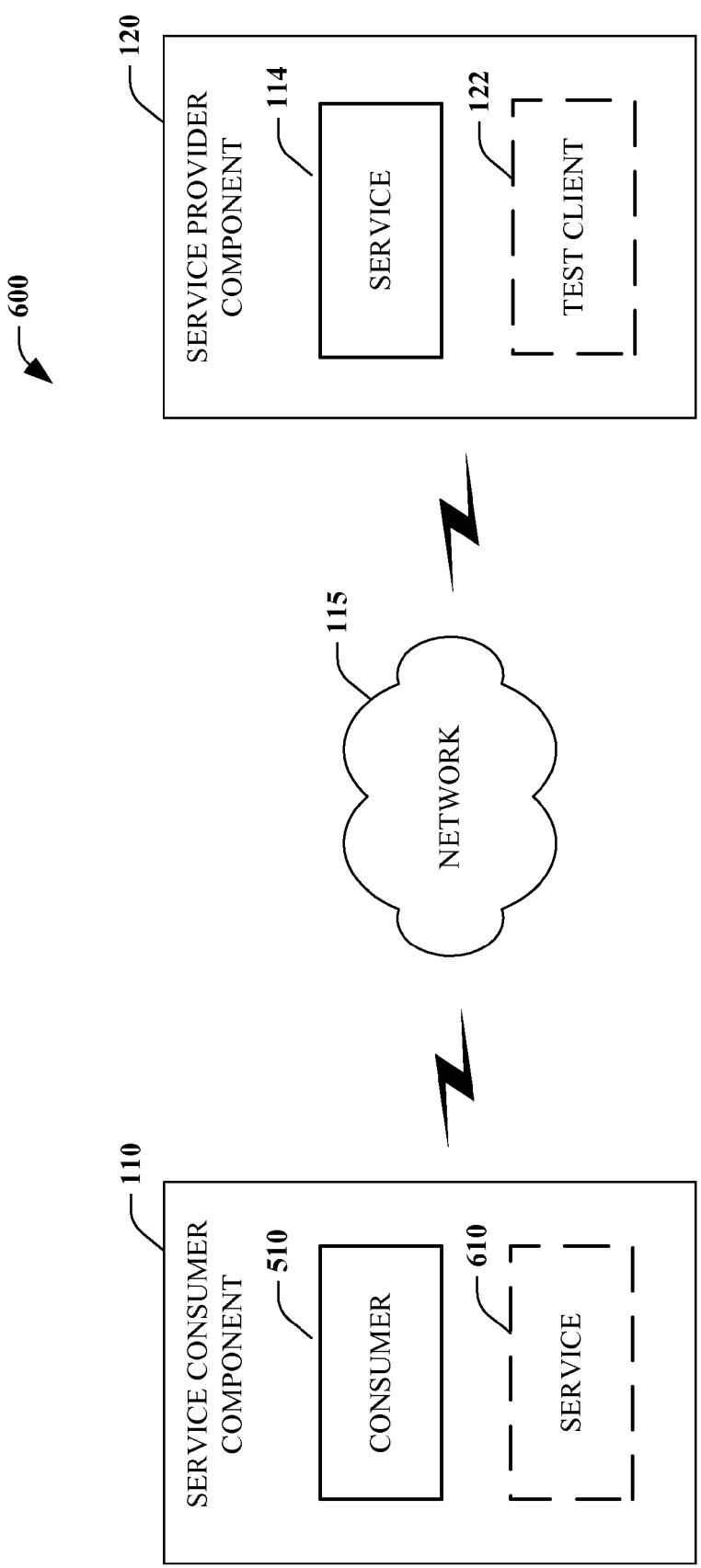
FIG. 6 is a block diagram of a service system running multiple services according to an aspect of the disclosed subject matter.

FIG. 6 illustrates a service system 600 running multiple services in accordance with an aspect of the claimed subject matter. Similar to system 500 of FIG. 5, the system 600 includes the service consumer component 110 and service provider component 120, where a consumer 510 is interacting with a service 114 across the network 115. While this service is being utilized, the provider component 120 can ship another service or proxy service component 610 to the service consumer component 110. A battery of tests can be executed on the service 610 utilizing provider component 120 resident test client 122. These tests can be performed when resources are determined or inferred to be available based on the state of service 114, among other things, so as not to significantly effect performance of service 114 with respect to consumer 510. For example, tests can be performed during breaks in execution.

Returning to FIG. 2 it is to be appreciated that the provider component 120 can also perform testing without reversing roles as previously described. Accordingly, the deployment component 230 can distribute a test client provided by test component 220 to a consumer, and service component 210 can execute the corresponding service to be tested. In one embodiment, the test client can be applied via a web browser. Moreover, monitor component 250 can be employed to improve testing in this mode.

Services need to be able to support many consumers at the same time. The ability of doing so is often critical to business. Consequently, before launching a service into production the service owners need to test the service in an environment that attempts to replicate these conditions. Test clients are employed to simulate functional and non-functional interactions of real customers with the service. However, this is a challenging proposition because of differences between test and real environments. In particular, typically it is not possible to have as many test clients as the consumers the service will have to support in reality. Further, in real operation the service provider may reach states that are hard to replicate in a test environment such as a number of concurrent requests, software and/or hardware failures, etc.

The monitor component 250 can monitor interactions with consumers. When it detects a state for which testing is desired (e.g., certain number of consumers, load level . . . ), it can trigger distribution of test clients to real customers by the deployment component 230, for instance. These test clients target a service under test, which could be the same or different service. In effect, by shipping test code to users for exercising a service, service owners can design and run tests in a real environment, something that typically is too expensive and/or not viable to replicate in a test environment.

Figure 7:
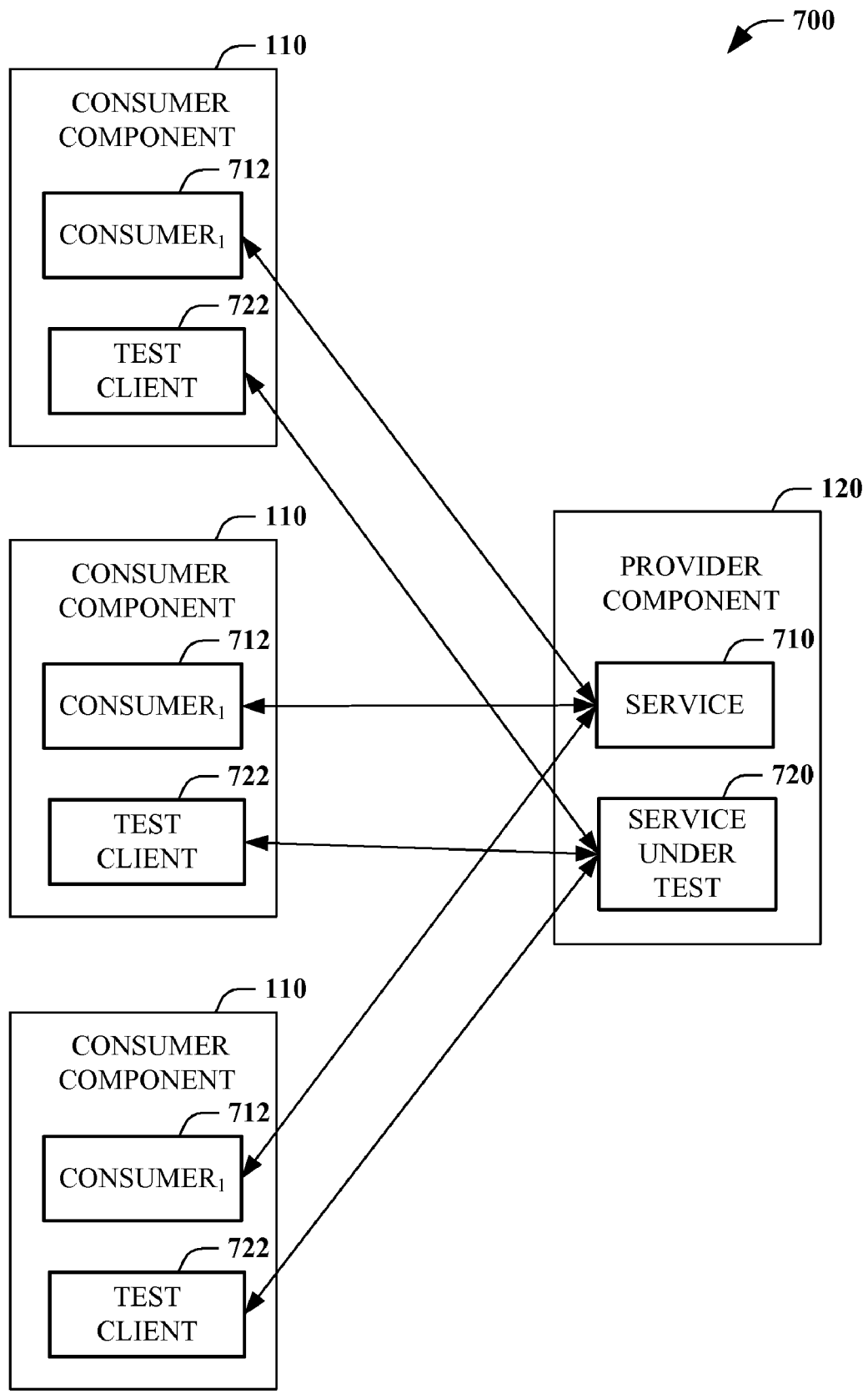
FIG. 7 is a block diagram of a system for testing a service in a real environment in accordance with an aspect of the disclosed subject matter.

FIG. 7 graphically depicts service-testing system 700 in accordance with the aforementioned real testing mode in accordance with an aspect of the claimed subject matter. Similar to previous testing systems described, the system 700 includes a plurality or consumer components 110 and a single provider component 120. A service consumer 712 is executed by each consumer component 110 on the consumer side to enable interaction with service 710 on the provider side. Interaction can be monitored by the provider component 120 and upon the occurrence of condition such as a predetermined number of consumers; the provider component 120 can distributed a test client 722 to each consumer component 110 to exercise a service 720 under test.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the monitor component 250 can employ such mechanisms to infer if and when to initiate testing. Similarly, the configuration component 240 can utilize these mechanisms to configure or otherwise optimize a service and/or consumer thereof based on test results, among other things.

Figure 8:
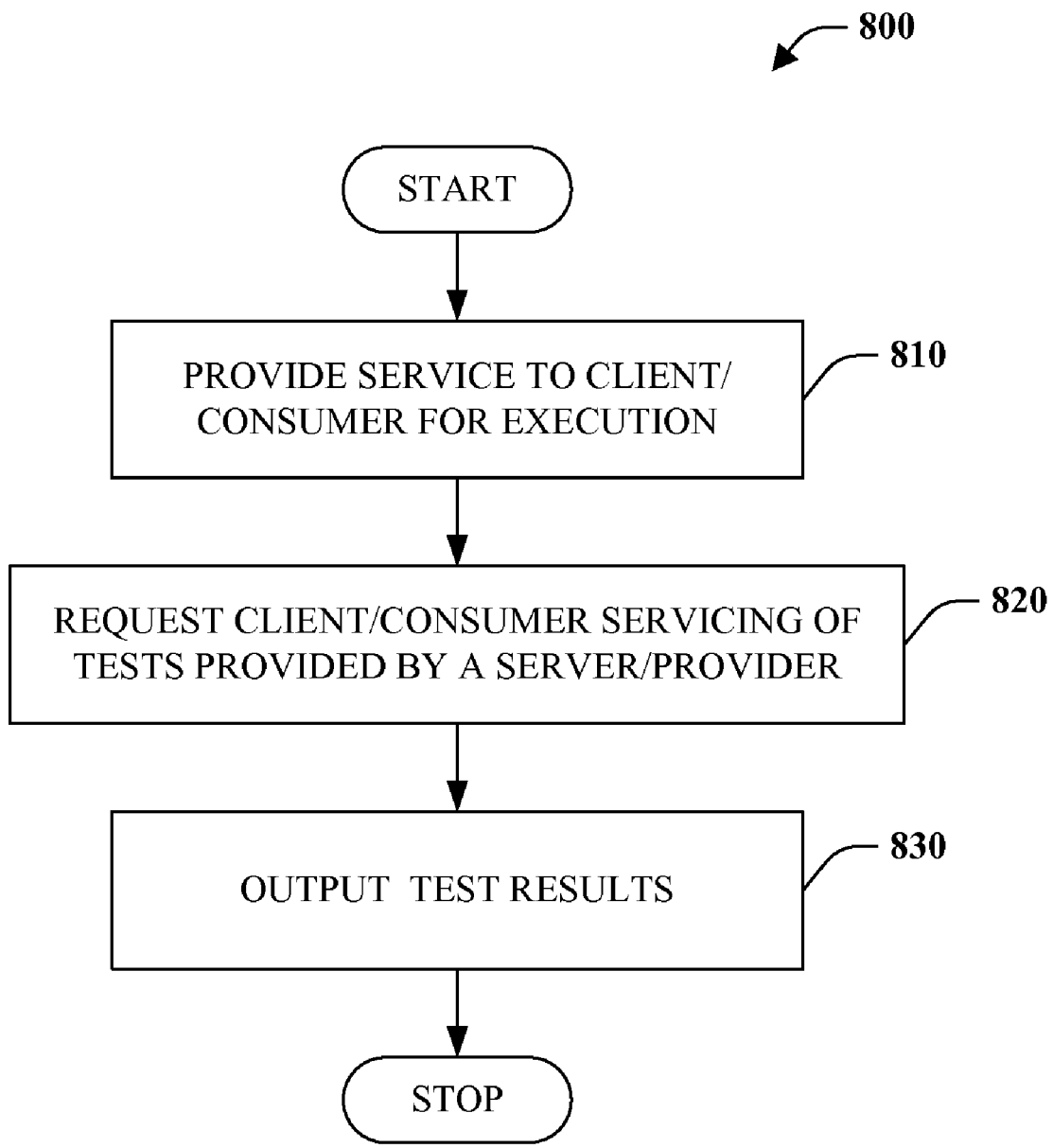
FIG. 8 is a flow chart diagram of a service provider test method in accordance with an aspect of the disclosed subject matter.
Figure 9:
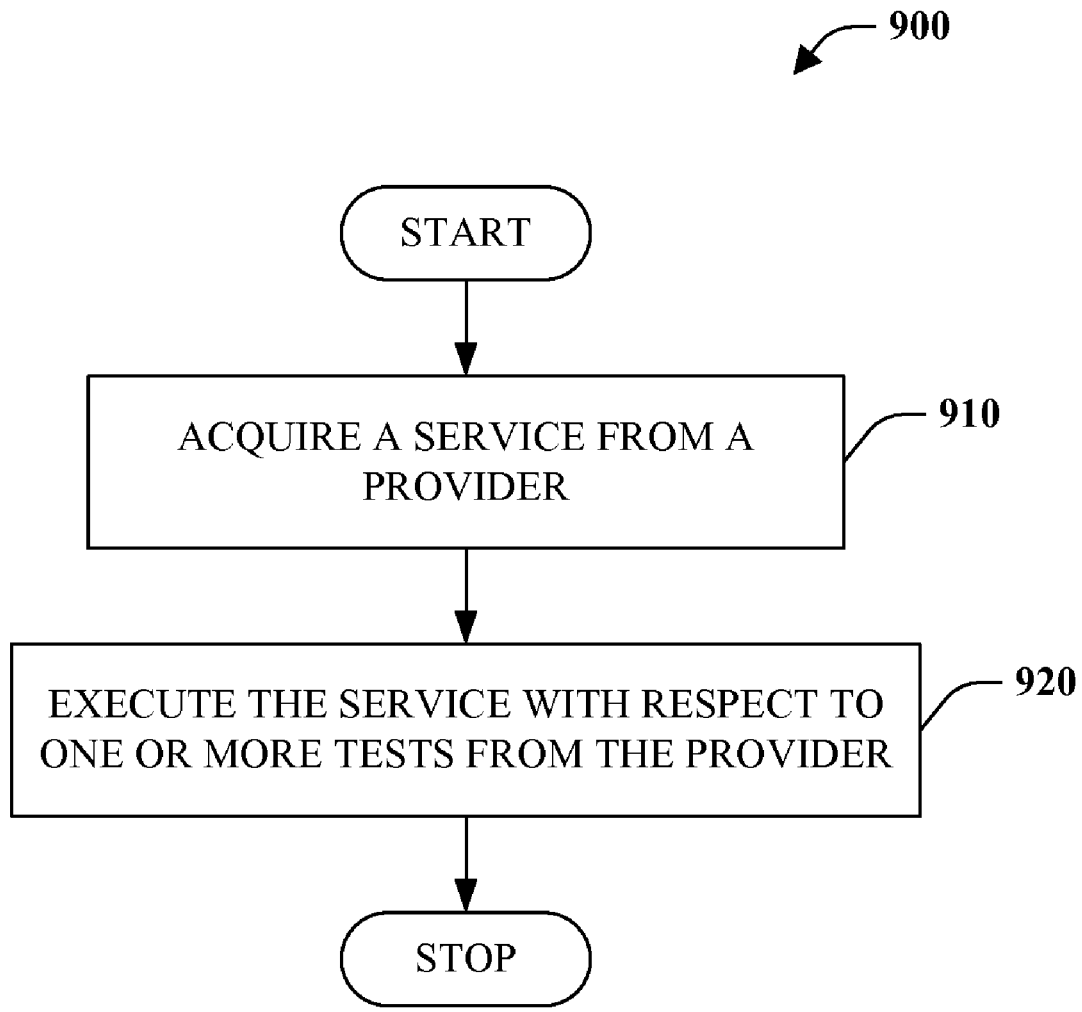
FIG. 9 is a flow chart diagram of a service consumer test method in accordance with an aspect of the disclosed subject matter.
Figure 10:
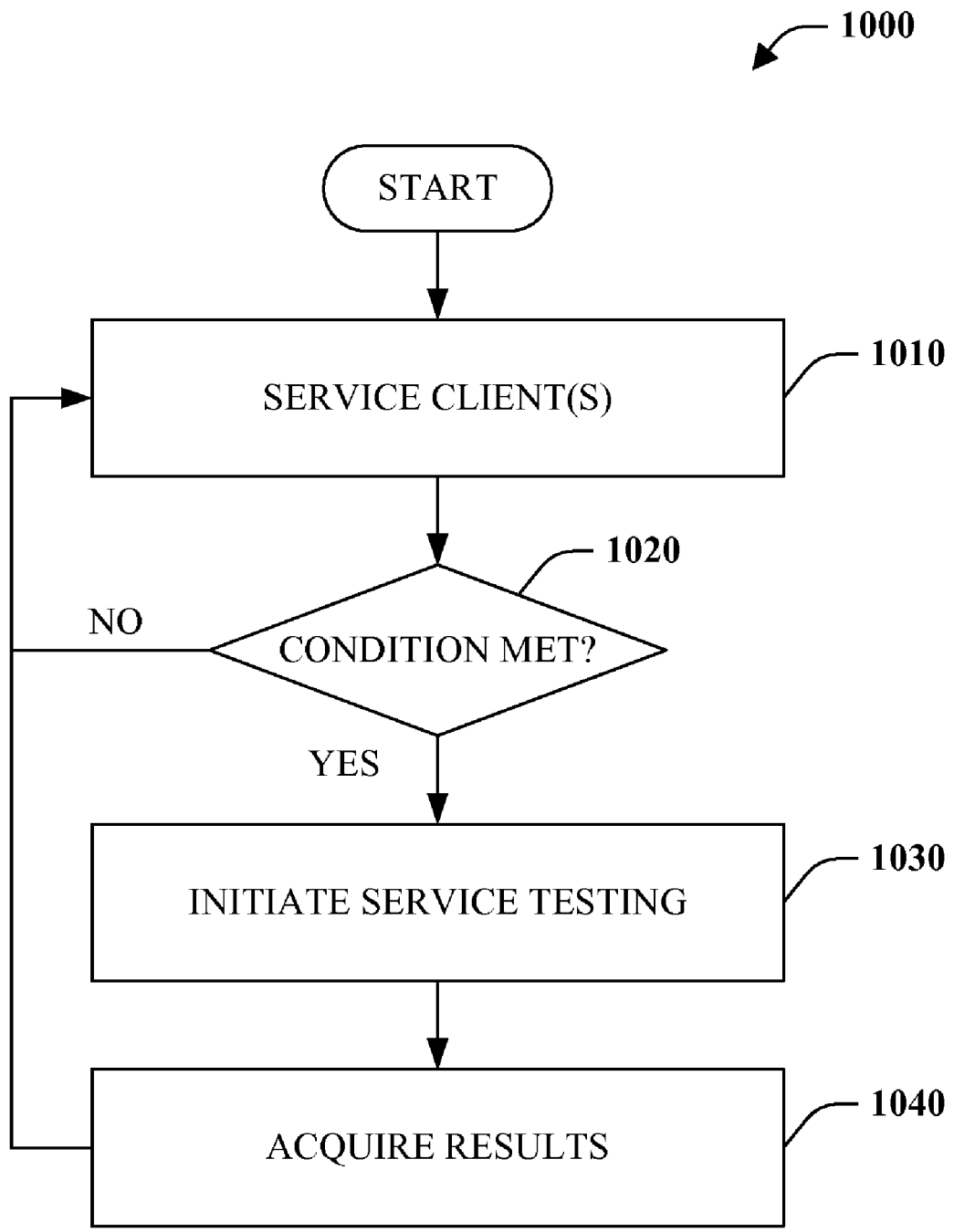
FIG. 10 is a flow chart diagram of a service testing method in accordance with an aspect of the subject disclosure.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a service provider testing method 800 is depicted in accordance with an aspect of the claimed subject matter. At reference numeral 810, a service is proved to a consumer/client for execution thereon. At numeral 820, a request is made to service a test, test client, or test harness provided by a provider/server. Tests can relate to evaluation of the service as well as consumer-provider communication mechanisms (e.g., local network, firewalls, spam filters . . . ). For example, the tests can place artificial constraints on a network to observe reaction to connection delays, connection drops, slow transmission, fast transmission, and eavesdropping, among other things. The consumer/client can utilize substantially any execution engine or runtime to exercise the service utilizing the test. However, in accordance with one aspect, a web browser or the like can be employed for processing. Results of the tests can subsequently be output or reported at numeral 830 to facilitate error correction and optimization, among other things. Once test results are processed, the service can be deployed or otherwise made available for use.

FIG. 9 is a flow chart diagram of a service consumer testing method 900 in accordance with an aspect of the claimed subject matter. At reference numeral 910, a service or proxy service desired to be tested is acquired from a provider/server. In one instance, this can be initiated by the consumer by navigating to a particular network address with a web browser or the like. From this point, the service can be loaded by the browser. At reference numeral 920, the service is executed with respect to one or more tests provided by a provider/server. For instance, the server can exercise the service with the tests within a browser. In accordance with one embodiment, it is to be noted that the tests can utilize consumer data without actually disclosing or compromising that data. For example, particularly problematic consumer data can be made available by the consumer in response to test requests for loading and/or processing of data. More specifically, a test may attempt to process claim amendments and the large number may cause the service to crash but the test would be unaware of the specifics of the amendments.

As per methods 800 and 900, it should be noted that in accordance with one embodiment the functions of the client and server are reversed for testing purposes and can later be swapped back for deployment. In particular, the consumer/client executes the service while the provider service supplies the tests. This counter-intuitive approach provides numerous benefits including but not limited to less consumer/client side intrusion, more testing flexibility, as well as consumer and provider side confidentiality. More generally, this arrangement leverages communication symmetry to compensate for asymmetric organizational control.

Turning attention to FIG. 10, a service testing method 1000 is provided in accordance with an aspect of the claimed subject matter. At reference numeral 1010, clients are serviced by provider services as is conventionally done. At numeral 1020, a determination is made as to whether a condition has been met. For example, the condition can correspond to server load or number of consumers, among other things. If the condition has not been met, the method continues at 1010 where customers are serviced and the condition satisfaction is periodically revisited at 1020. If, however, the condition is satisfied at 1020, then the method proceeds to 1030. At numeral 1030, testing is initiated to test new features of a current service or a completely new service, for instance. Testing at 1130 can be accomplished one of at least two different ways. First, a service can be provided to each consumer and a test client resident on a provider/server utilized to exercise the service in an attempt to identify problems. Alternatively, it should be appreciated that a more conservative testing method can be employed in which test clients or a small test script are provided to consumer/clients to exercise a provider/server service. Test results are acquired at reference numeral 1040 and clients can continue to be serviced at 1010. In this manner, tests are run in a real environment, which may not otherwise be available in a test environment.

As used herein, the terms "component," "system" and the like are intended to refer to a computer-related entity, either hardware, a combination of hardware and software, software, or software in execution. For example, a component can be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. It is to be noted that services, tests, or test clients can be components as defined herein.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
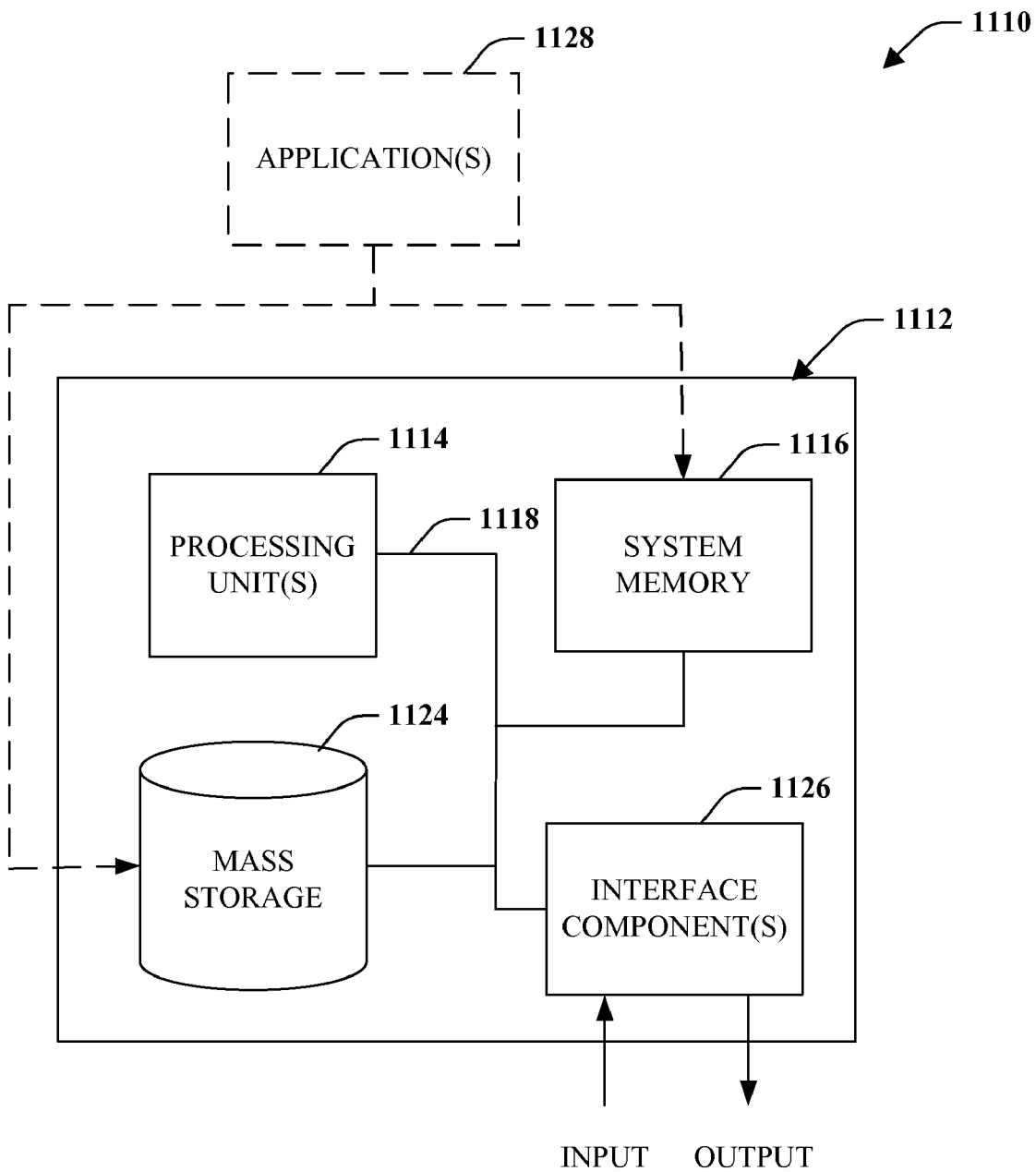
FIG. 11 is a schematic block diagram illustrating a suitable operating environment for aspects of the subject disclosure.
Figure 12:
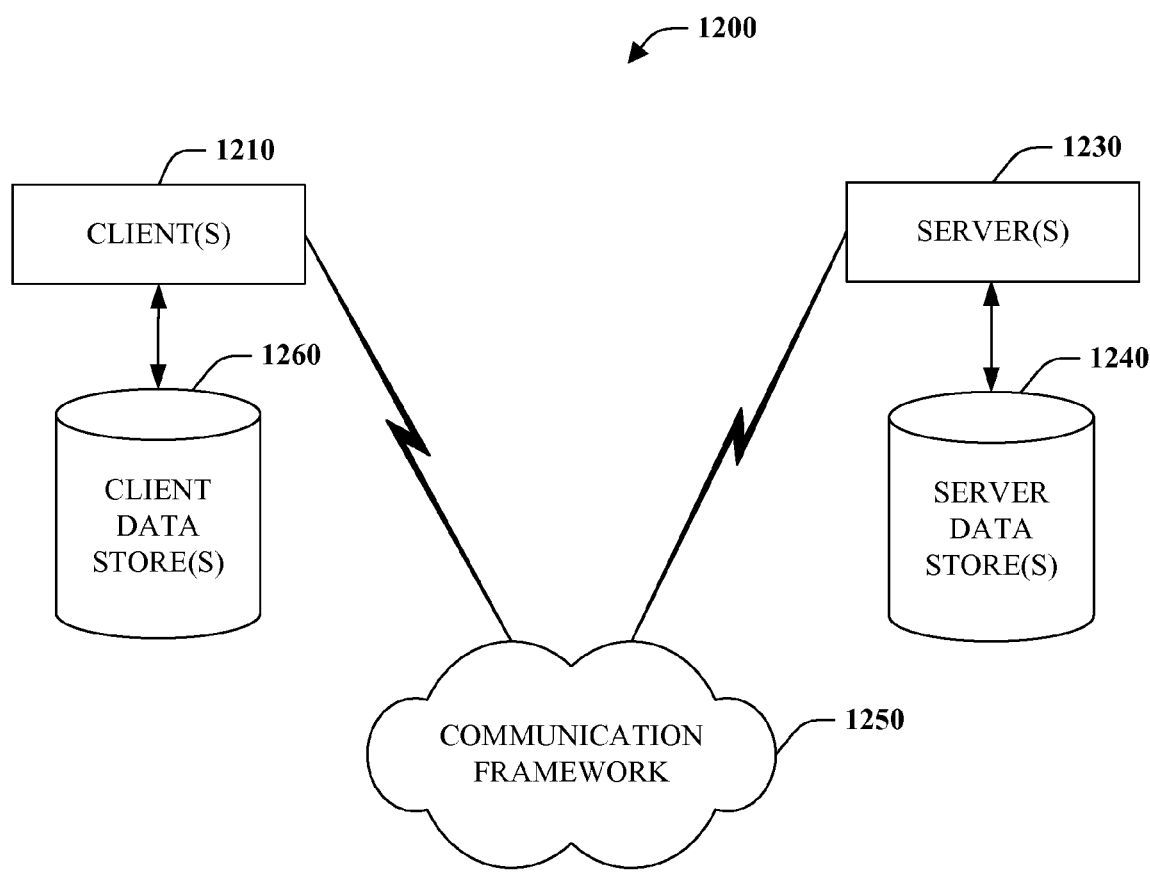
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect with respect to various aspects of the claimed subject matter. In fact, service testing is based on use of client(s) 1210, server(s) 1230, and communication framework 1250. More specifically, where a service is to be tested a test client can be provided to the client(s) to exercise a service provided by server(s) 1230. Alternatively, the roles can be swapped and the service can be transmitted to the client(s) 1210 while the test remains on the server(s) 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A service testing system, comprising:
   a processor;
   a consumer component configured to host a first service and interact with a second service;
   a provider component configured to generate a test client on the provider component and host the second service, the test client being configured to provide a test of the first service in response to cessation of interaction between the consumer component and the second service;
   a deployment component configured to deploy the first service on the provider component and enable interaction with the consumer component;
   a configuration component configured to generate a configuration for the first service that provides an optimization of processing efficiency based on results of the test; and
   a computer-readable storage medium storing instructions that, when executed by the processor, cause the processor to implement at least one of the consumer component, the provider component or the deployment component.

2. The service testing system of claim 1, wherein the first service is configured to execute within a client environment.

3. The service testing system of claim 1, wherein the consumer component and the provider component are deployed by different organizations.

4. The service testing system of claim 3, wherein the test is configured to evaluate a communication path between the consumer component and the provider component and to verify behavior of at least one of the consumer component or the provider component.

5. The service testing system of claim 1, wherein supply of the first service is by the provider component.

6. The service testing system of claim 5, wherein the configuration component is further configured to configure the first service prior to supplying the first service.

7. The service testing system of claim 1, wherein the test client is further configured to generate additional tests or modify the test.

8. A computer-implemented service testing method, comprising:
   employing a processor to execute computer-executable instructions that, when executed, cause the processor to perform:
   hosting a first service on a first component;
   interacting, by the first service, with a second component over a network;
   generating a test client at the first component to test a second service provided at the second component;
   initiating testing of the second service during or in response to cessation of interaction between the second component and the first service;
   generating a configuration based on the testing resulting in an error, the configuration including parameters configured to rectify the error and deploying the second service on the first component and enabling interaction with the second component.

9. The computer-implemented service testing method of claim 8, further comprising providing the second service to a web browser associated with the second component.

10. The computer-implemented service testing method of claim 9, wherein the providing the second service is performed based, at least, upon navigation of the web browser to a specific web address.

11. The computer-implemented service testing method of claim 8, further comprising performing the deploying the second service prior to testing the second service.

12. The computer-implemented service testing method of claim 11, further comprising re-configuring the second service based on the results of the testing.

13. The computer-implemented service testing method of claim 8, further comprising modifying the testing.

14. The computer-implemented service testing method of claim 8, wherein the providing the second service is also performed during cessation of interaction between the second component and the first service.

15. The computer-implemented service testing method of claim 8, wherein the testing of the second service is performed utilizing client data associated with the second component.

16. A computer-implemented service testing method, comprising:
    employing a processor to execute computer-executable instructions that, when executed, cause the processor to perform:
    servicing one or more network service clients;
    transmitting a test to at least one of the one or more network service clients, the transmitting being performed based on an occurrence of a condition;
    generating a configuration based on the test resulting in an error, the configuration including parameters configured to rectify the error; and
    executing a first network service on a server, the executing the first network service being performed in accordance with specifications of the test, the test being of the first network service, and the test utilizing information maintained as confidential at the one or more network service clients and unexposed to the server.

17. The computer-implemented service testing method of claim 16, further comprising monitoring interactions with the one or more network service clients, and the condition being a selected server load associated with the one or more network service clients.

* * * * *